May 20, 1930. C. RASMUSSEN 1,758,973
PIPE THREADING MACHINE
Filed Dec. 16, 1926 4 Sheets-Sheet 2
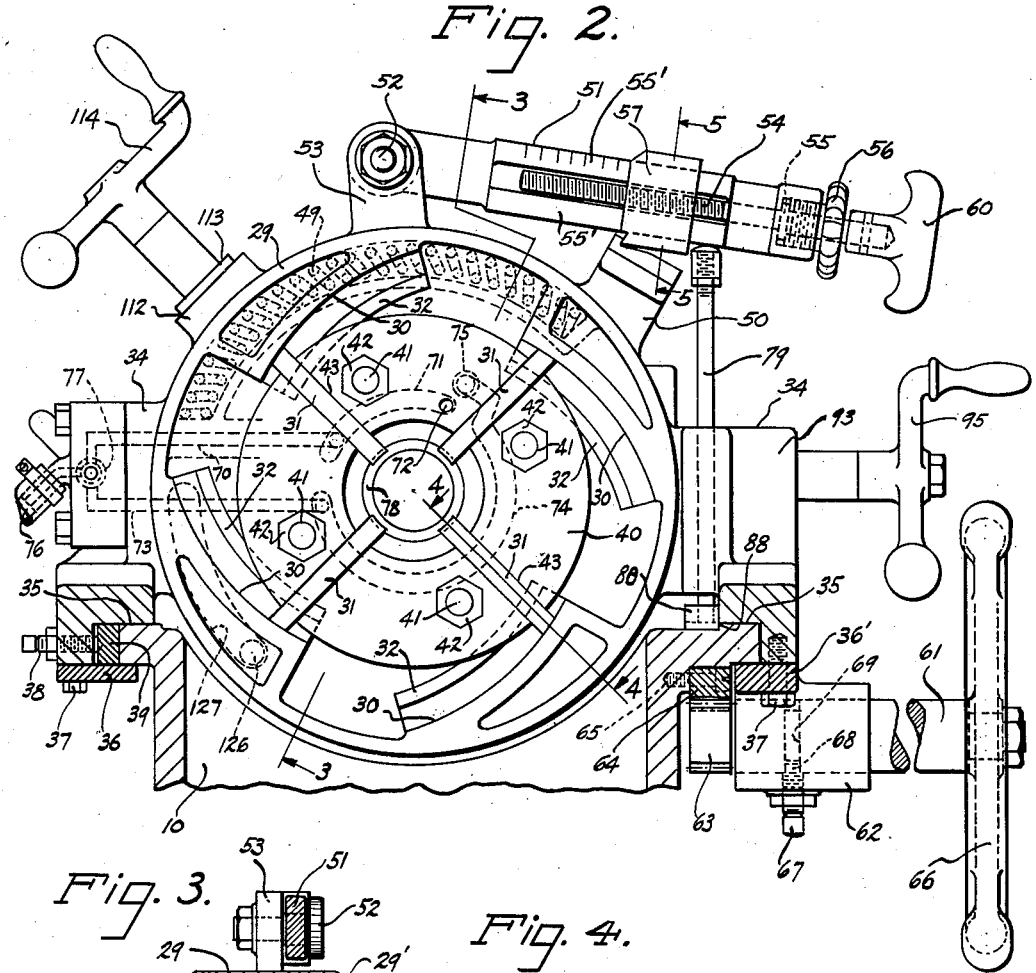
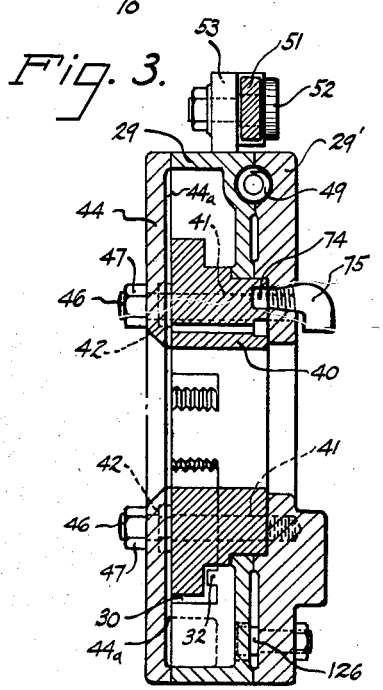
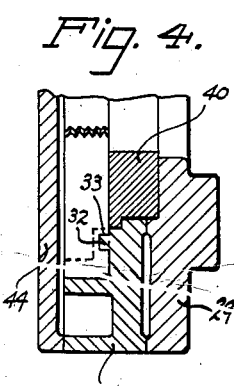
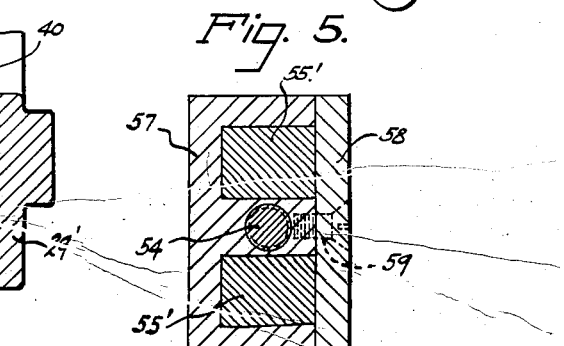
INVENTOR
Charles Rasmussen
BY
ATTORNEY May 20, 1930. C. RASMUSSEN 1,758,973
PIPE THREADING MACHINE
Filed Dec. 16, 1926  4 Sheets-Sheet 3

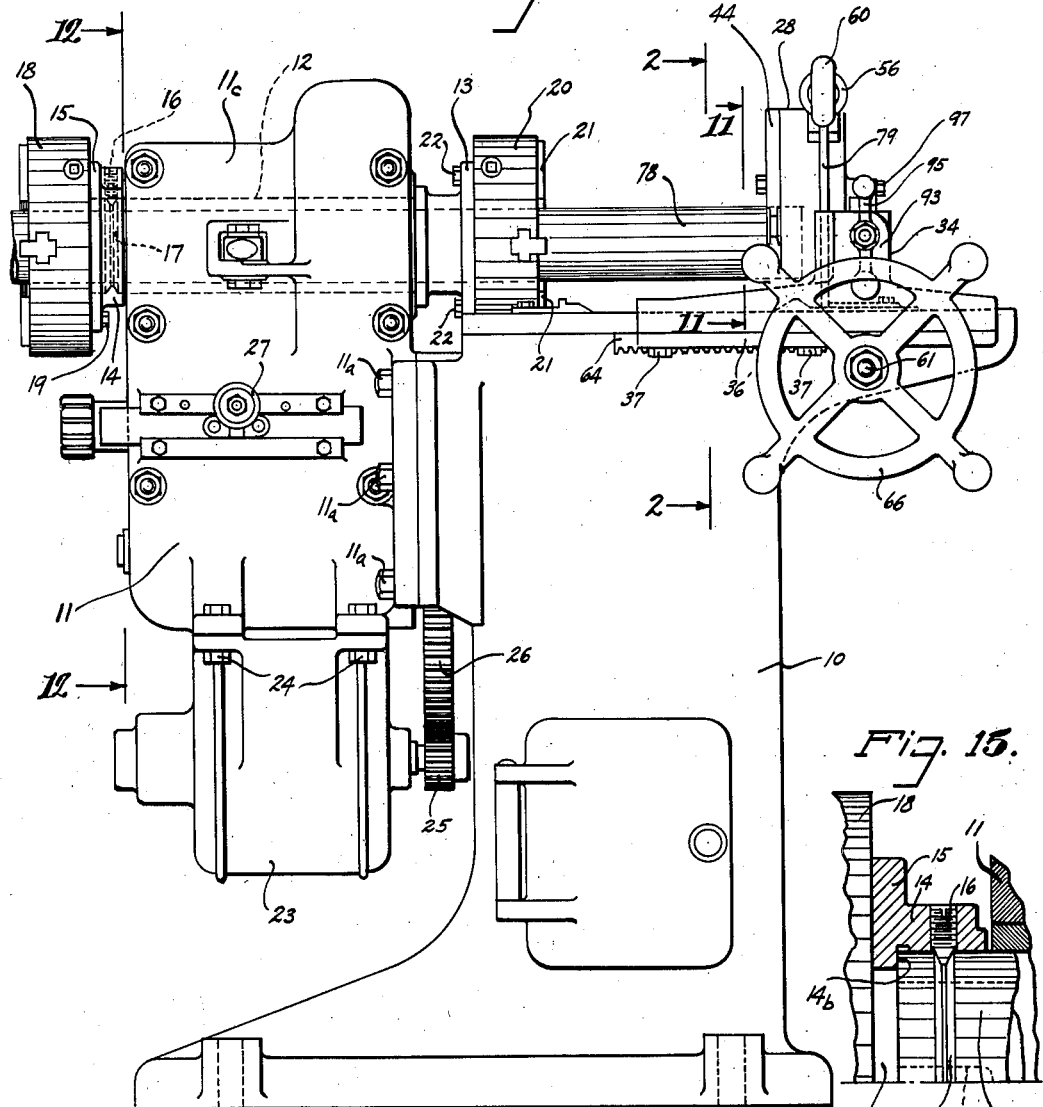

INVENTOR
Charles Rasmussen
BY
ATTORNEY

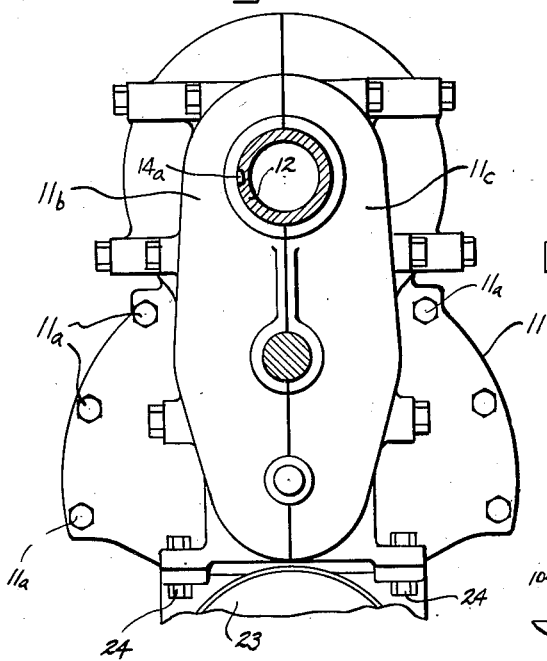
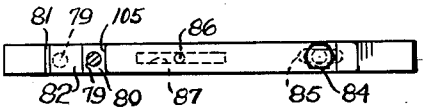
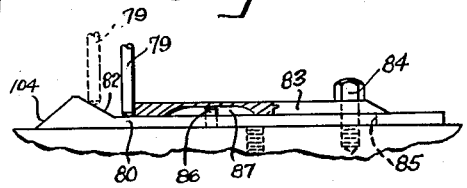
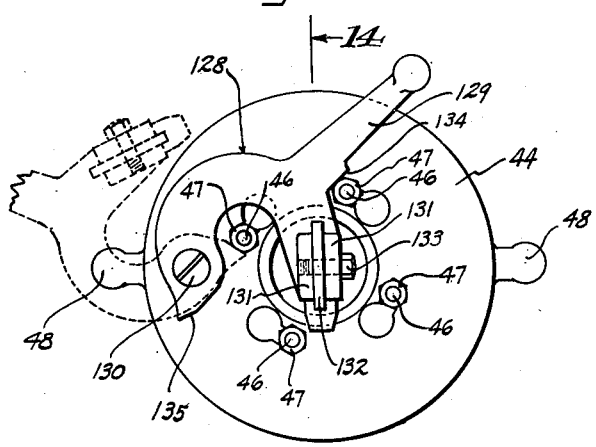
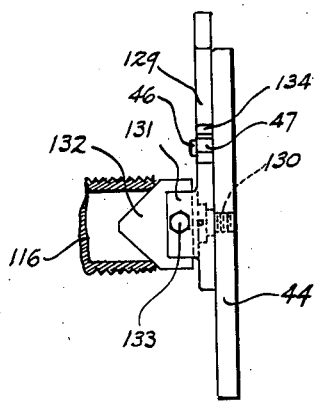

Patented May 20, 1930

1,758,973

UNITED STATES PATENT OFFICE

CHARLES RASMUSSEN, OF RACINE, WISCONSIN, ASSIGNOR OF ONE-HALF TO RALPH T. INGALLS, OF RACINE, WISCONSIN

PIPE-THREADING MACHINE

Application filed December 16, 1926. Serial No. 155,117.

This invention relates to improvements in pipe-threading machines.

One of the objects of the present invention is to provide an improved machine of the character referred to having a die head which may be readily opened or closed and which may be easily adjusted to vary the size of the threads to be cut, and wherein means are provided for causing the die head to open automatically upon feeding movement of the die head a predetermined amount whereby for each operation of the machine the same is made to cut a certain and predetermined number of threads as determined by the adjustment made by the operator.

Another object is to provide, in a machine of the character referred to, improved means for suspending or supporting the die head on both sides thereof at the center whereby substantially all stress and leverages are eliminated and straight-line thrust produced against the chasers.

Another object is to provide, in a machine of the character referred to and which is provided with a die head, an improved construction whereby the die center ring for holding the chasers may be readily removed when worn and replaced by a new one without losing the center.

Another object is to provide, in a machine of the character referred to, an improved die head having a face plate and means for holding the same in position so that equal compression may be brought to bear on each side of the die chasers rather than upon only some of the latter, as in constructions used heretofore whereby shaking and vibration of the chasers are eliminated which have, in constructions used heretofore, been the cause of wavy threads.

Other objects and advantages will hereinafter appear.

For the purpose of illustrating the invention, one embodiment thereof is shown in the drawings, in which Figure 1 is a side elevational view of the improved machine;

Fig. 2 is an enlarged sectional view, taken on the line 2—2 in Fig. 1, some of the parts being removed for the sake of clearness;

Fig. 3 is a sectional view, taken on the line 3—3 in Fig. 2;

Fig. 4 is a sectional view, taken on the line 4—4 in Fig. 2;

Fig. 5 is an enlarged sectional view, taken on the line 5—5 in Fig. 2;

Fig. 9 is an enlarged plan view of certain of the parts comprising the automatic die-opening mechanism;

Fig. 10 is a front elevational view, partly in section, of Fig. 9;

Fig. 11 is a sectional view, some of the parts being removed for the sake of clearness, the section being taken on the line 11—11 in Fig. 1;

Fig. 12 is a sectional view, the section being taken on the line 12—12 in Fig. 1;

Fig. 13 is a view similar to Fig. 11, showing the reaming or chamfering attachment employed in making nipples;

Fig. 14 is a side elevational view partly in section, the section being taken on the line 14—14 in Fig. 13; and Fig. 15 is a detail fragmentary sectional view taken from Fig. 1.

Figure 6:
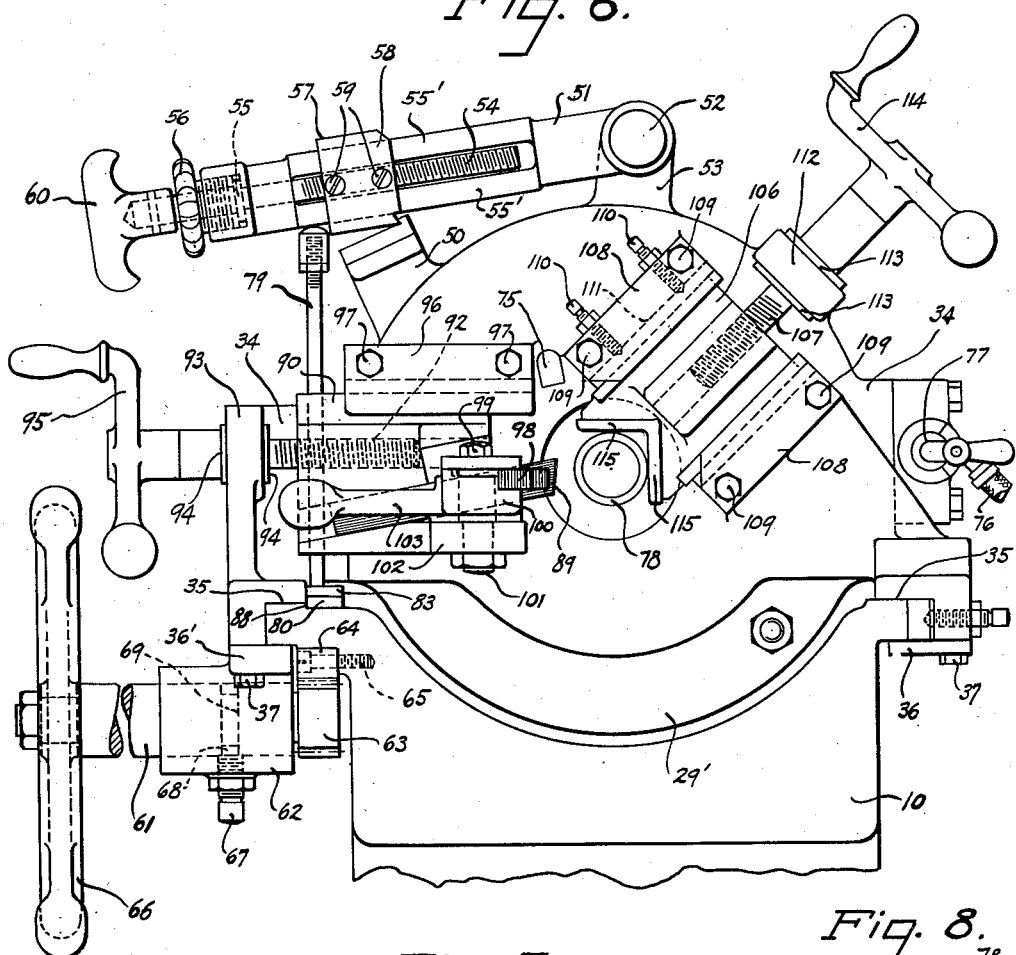
Fig. 6 is an enlarged end elevational view, looking toward the left in Fig. 1.

The base 10 of the machine is provided with the usual gear casing 11 in which is journaled the spindle 12 provided at one end with the flange 13 which may be formed integrally therewith and at its other end with the collar 14 provided with the flange 15. The collar 14 is fixed to the spindle for rotation therewith by the key 14$^a$ and is held in position on the spindle by means of suitable set screws 16 threaded into the collar with their inner tapered ends entering a V-shaped groove 17 in the spindle, the action being such that upon tightening of screws 16 the wedging action between the same and grooves 17 operates to hold the collar securely in position on the end of spindle 12 with its shoulder 14$^b$ in tight engagement therewith, as shown in Fig. 15. A chuck 18, which may be of the well known three-jaw universal lathe type, is secured by means of bolts 19 to flange 15 for rotation with spindle 12, a similar chuck 20 having jaws 21 being secured by means of bolts 22 to flange 13. The chucks 18 and 20 remain rigid at all times with spindle 12 for rotation therewith about the axis of the same. Chuck 18 may be removed for repair or other purposes by removing either the bolts 19 or set screws 16, while chuck 20 may be removed by removing bolts 22.

The spindle 12 is shown as being driven by an electric motor 23 secured by bolts 24 to the gear box or casing 11 and being provided with a gear 25 fixed on the motor armature shaft and meshing with a larger and similar gear 26 which in turn drives the spindle through the usual transmission unit (not shown) arranged in casing 11 and controlled by a suitable manually-operable member 27 to obtain the various driving speeds. As the construction just described forms no part of the present invention, the same has only been shown and described in sufficient detail to enable those skilled in the art to understand in what way the present improvements may be embodied in a pipe-threading machine of the general type shown.

The gear box or casing 11 is secured to the base 10 of the machine by the bolts 11ª and comprises the two complementary sections 11ᵇ and 11ᶜ fitted and held together by the bolts 11ᵈ with their respective adjacent edges disposed in the vertical plane passing through the axis of spindle 12, as shown in Fig. 12. The improved construction just described permits of ready assembly of the sections 11ᵇ and 11ᶜ to provide the casing 11 which is secured to the machine base 10, as explained, by bolts 11ª, and provides the bearings for spindle 12, supports and encloses the transmission unit for connecting the spindle to motor 23, and supports the motor, this construction in these respects having advantages over constructions used heretofore and, further, permitting of more compact, durable and cheaper construction.

The die head, designated generally in Fig. 1 by the reference numeral 28, comprises the cam ring or part 29 provided with the usual cam surfaces 30 engaging the outer ends of the chasers 31 and with the upstanding flanges 32 which are received by recesses 33 formed in the adjacent edges of the chasers, as more clearly shown in Fig. 4. The die part 29′ which is complementary to die part 29 is provided with the horizontally disposed supporting members or portions 34 extending outwardly from each side thereof and seating on spaced runways 35 with which base 10 is provided and which are parallel to the axis of rotation of spindle 12. For the purpose of holding the die head 28 in position on runways 35, guide strips 36 and 36′ may be secured to the under sides of the supporting members 34 by bolts 37, these strips permitting of free sliding movement of the die head along the runways. Lateral play between the die head and the runways may be taken up by inward adjustment of bolts 38 whose ends engage a strip 39 seating on strip 36 and disposed between the associated supporting member 34 and runway 35, as more clearly shown in Fig. 2. The die head comprises, further, the center ring 40 extending loosely through part 29 and being fixed rigidly to the part 29′ by means of stud bolts 41 which pass through the ring and are threaded into part 29′, the bolts being provided intermediate their ends with the heads 42 which engage the adjacent face of ring 40, as more clearly shown in Fig. 3. The chasers 31 are supported and guided in radially extending slots 43 with which the center ring is provided whereby rotary movement of the die part 29 with respect to die part 29′ in a counter-clockwise direction, as viewed in Fig. 2, operates to cause adjusting movement outwardly of the chasers by reason of their coaction with the flanges 32 with which the die part 29 is provided, as explained, while such movement of the die part 29 in the opposite direction operates to cause inward adjusting movement of the chasers by reason of the engagement of their outer ends with the cam surfaces 30.

The chasers 31 are held in slots 43 and the operating parts of the die head protected by the face plate 44 fitted against the die part 29 and provided with the bayonet slots 45 which receive the outer ends 46 of stud bolts 41, the plate 44 being provided with the inwardly extending ribs 44ª arranged to bear against the respective adjacent edges of chasers 31 with equal compression when the plate is in position and to hold the chasers against shaking and vibration while permitting of sliding adjusting movement thereof in slots 43. Nuts 47 threaded on the bolt ends 46 hold the face plate in position and tightened sufficiently to cause ribs 44ª to bear with equal compression on each of the four die chasers, as explained. In removing the face plate for any purposes, the nuts 47 are first loosened and the face plate then given a partial turn in a counter-clockwise direction, as viewed in Fig. 11, by means of handles 48 whereby the larger ends of bayonet slots 45 are placed in registration with nuts 47, at which time the face plate may be removed outwardly to the left, as viewed in Fig. 3. If the slots 43 in center ring 40 become worn, the ring may be removed by unscrewing the four stud bolts 41 and a new ring placed in position without losing the center and without the loss of any great amount of time. It will therefore be seen that the stud bolts 41 act to hold both the center ring 40 and face plate 44 in position, and in this respect are common to the latter. As shown in Fig. 3, the adjacent faces of the die parts 29 and 29' are recessed to receive the spring 49, the latter being held compressed between the die parts and at all times urging part 29 in a counter-clockwise direction, as viewed in Fig. 2, with respect to part 29' whereby the die parts tend to adjust themselves at all times to cause outward adjusting movement of chasers 31 to place the same out of cutting relation with respect to the work.

The means for adjusting the die parts 29 and 29' may comprise the element or lug 50 carried by and fixed with respect to part 29' and the element or arm 51 pivotally connected at one end by the bolt 52 to the lug 53 with which the die part 29 is provided. The screw 54 extends loosely through the free end of arm 51 and is disposed between the spaced guide portions 55' thereof. The screw 54 is provided with the collar 55 disposed between the end of arm 51 and a nut 56 threaded into the latter and through which the screw loosely passes whereby the screw is held against axial movement with respect to arm 51, but is permitted to rotate freely about its own axis for the purpose hereinafter explained. A block or latch 57 is slidably fitted over the guide portions 55' and may be held in place by a plate 58 secured to the block by screws 59, the screw 54 being threaded through the block, as more clearly shown in Fig. 5, whereby rotation of the screw by means of the handle or wrench 60 operates to adjust the block axially with respect to arm 51. From the foregoing it will be seen that the block or latch 57 may be placed in latching relation with element 50 to hold the die part 29 against rotary or adjusting movement under the action of spring 49 and that upon rotation of screw 54 in either direction the block 57 will be adjusted axially with respect to arm 51 to cause inward or outward adjusting movement of the chasers, and that upon tightening of nut 56 screw 54 and block 57 are held in adjusted position. After one end of a pipe section has been threaded the operator may readily and quickly move the chasers out of cutting relation with the work by raising arm 51 to disengage latch 57 from element 50 and permit rotary movement of the die part 29 in a counter-clockwise direction, as viewed in Fig. 2, under the action of spring 49. In making the next cut, the operator has but to grasp the arm or element 51 and pull the same to the right, as viewed in Fig. 2, against the action of spring 49 and place latch 57 into interlocking engagement again with element 50. It will therefore be seen that the die may be readily and quickly opened without changing the adjustment thereof, and may be closed again immediately to place the chasers in their same position of adjustment as they were in before, and that this operation is made without the necessity of screwing or unscrewing any fastening devices, as in die heads of this general type constructed heretofore. With the parts in their respective positions as shown in Figs. 2 and 6, the chasers 31 may be adjusted inwardly or outwardly, as desired, to vary the depth of the thread to be cut by first loosening the lock nut 56 and then rotating screw 54 in the proper direction. Assuming that screw 54 is rotated to cause movement of block 57 to the right, as viewed in Fig. 2, with respect to the arm or element 51, the compressed spring 49 will cause a corresponding movement of the die part or cam ring 29 in a counter-clockwise direction to cause outward adjusting movement of the chasers and to hold block 57 in engagement with element 50. Reverse rotation of screw 54 will cause axial movement of block 57 to the left, as viewed in Fig. 2, with respect to the arm or element 51 and corresponding reverse movement of die part 29 and inward adjusting movement of the chasers 31. After the adjustment has been made, lock nut 56 is again tightened to hold block 57 in adjusted position. The upper guide portion 55' of element 51 may be graduated, as indicated in Fig. 2, to provide an indication for the operator as to the position of adjustment of the die chasers.

Manually-operable means are provided for causing the die head to slide along runways 35, and comprise the shaft 61 journaled in the bearing 62 which may be formed integrally with the guide strip 36' and provided at one end with the pinion 63 meshing with the rack 64 secured to base 10 by bolts 65, the other end of the shaft being provided with the hand wheel 66 for rotating the same. The screw 67 is threaded upwardly into bearing 62 and is provided with the reduced end 68 which fits loosely in the annular groove 69 in shaft 61 whereby the latter is held against axial movement in bearing 62.

An oil passage 70 may be formed in the die part 29' and arranged to communicate with an oil passage 71 formed in center ring 40 and opening at 72 in the exposed face of the center ring whereby oil is caused to drop down between the center ring and face plate 44 and upon the pipe at the chasers. Similar oil grooves 73 and 74 may be formed in the die part 29 and center ring 40, respectively, and an elbow 75 may be threaded into die part 29' at the upper end of passage 74 and arranged to direct oil upon the cut-off and reaming or chamfering tools, as will hereinafter appear. Lubricating oil may be supplied to passages 70 and 73 through a supply connection 76 and a suitable two-way valve 77 of any well known construction. As shown in Fig. 1, the pipe 78 to be threaded is passed through chucks 18 and 20 and held by the latter for rotation therewith, and the hand wheel 66 then turned in a clockwise direction to carry the die head forward to the left until the die chasers begin to cut into the pipe to make the threads, after which the die head is carried forward without further attention by reason of the threaded engagement of the die chasers with the pipe.

The means or mechanism for causing the die head to open automatically after the desired number of threads have been cut will now be described. A push-rod 79 extends loosely through one of the supporting members 34 for vertical reciprocatory movement and is arranged below the pivotally mounted element 51 to engage and raise the same upon upward movement of the push-rod to move the block or latch 57 out of engaging relation with element 50 whereby spring 49 is then free to cause rotary movement of the die part or cam ring 29 with respect to the die part 29' to cause adjusting movement of chasers 31 out of cutting relation with pipe 38, as explained above. For the purpose of tripping or imparting upward movement to push-rod 79, the lower end thereof is caused to slide along a member 80 fixed with respect to the base 10 of the machine and provided with the raised portion 81 having the cam face 82 which the push-rod rides upwardly upon to release latch 57 after the die head has traveled a certain and fixed distance to the left, as viewed in Fig. 1. A member 83 is superimposed upon member 80 and these members held together by the bolt 84 which is threaded into base 10 of the machine and which passes through an opening in one end of member 83 and through the slot 85 in the adjacent end of member 80. A pin 86 fixed in member 80 fits loosely in an elongated recess 87 in the under side of member 83 to prevent pivotal movement of the latter with respect to member 80 about bolt 84 as a center while permitting of longitudinal adjustment of member 80 with respect to member 83 for the purpose hereinafter explained. As more clearly shown in Figs. 2 and 6, the lower member 80 rests against the shoulder 88 with which base 10 is provided whereby members 80 and 83 are held against pivotal movement together about bolt 84 as a center. When the die head is moved forwardly to the left, as viewed in Fig. 1, and push-rod 79 rides up on the cam surface 82 to its dotted line position as shown in Fig. 10 to trip block 57 in the manner and for the purpose explained. The hand wheel 66 is then rotated in a clockwise direction, as viewed in Fig. 1, to carry the die head forward until the threaded end of the pipe extends outwardly beyond the die head a distance equal to the length of the pipe section to be made. This section is then cut off from the stock by the means now about to be described.

Figure 7:
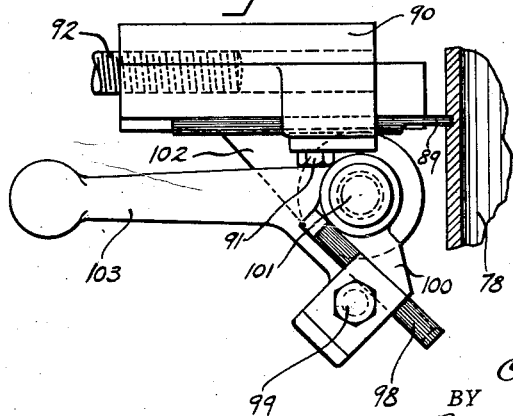
Fig. 7 is an enlarged plan view of the cut-off and reaming or chamfering arrangement, the cut-off tool being shown in operation.
Figure 8:
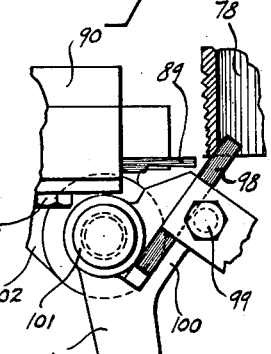
Fig. 8 is a view similar to Fig. 7, the cut-off tool, however, being shown withdrawn out of cutting position and the reaming or chamfering tool in operating position.

Referring more particularly to Figs. 6, 7 and 8, the tool 89 is secured in the block 90 by the bolt 91, the block being mounted on the screw 92 which passes loosely through the lug 93 formed integrally with the adjacent supporting member 34, the screw being provided on either side of lug 93 with the collars 94 which prevent axial movement of the screw with respect to lug 93 while permitting of free rotation of the screw to cause adjusting movement of tool 89 into and out of cutting position with respect to the pipe 78, the outer end of screw 92 being provided with the handle or wrench 95 for rotating the same. A plate 96 secured by means of bolts 97 to the die part 29' overhangs the outer edge of block 90, as shown, and provides additional guiding means therefor to prevent rotation of the same with screw 92 while permitting of movement of the block along the screw upon rotation of the latter. The reamer or chamfering tool 98 is secured by means of the bolt 99 in a holder 100 pivotally connected by means of the bolt 101 to the lug 102 which may be formed integrally with block 90, the holder 100 being provided with the handle 103 whereby the tool 98 may be swung into or out of cutting position, as shown in Figs. 7 and 8. When the end of the stock has been threaded in the manner explained, the reamer or chamfering tool 98 is moved in to cutting position, as shown in Fig. 8, and the die head advanced until the tool 98 engages the end of the stock, as shown, after which the tool 98 is moved out of cutting position, as shown in Fig. 7, and the die head further advanced by means of the hand wheel 66 until the desired length of the stock extends beyond the die head to the right, as viewed in Fig. 1, after which screw 92 is rotated by the handle 95 to advance the cut-off tool 89, as shown in Fig. 7, to cut the desired length of pipe from the stock. The die head 28 is then retracted by rotating hand wheel 66 in a counter-clockwise direction, as viewed in Fig. 1, until the push-rod 79 rides up on the cam surface 104 of portion 81 and down along the cam surface 82 of the latter and engages the end 105 of member 83. The arm or element 51 is then moved to the right, as viewed in Fig. 2, and block 57 interlocked with element 50 whereby the die chasers are placed in their same position of adjustment as they were in before, and the stock or pipe 78 again advanced through chucks 18 and 20 until the end thereof engages the die chasers, it being understood that the chucks 18 and 20 are loosened in the usual maner to permit advancement of the stock and are again tightened. The operation is then repeated to thread the cut end of the stock, the push-rod 79 advancing with the die head from the full line position to the dotted line position shown in Figs. 9 and 10 to automatically open the die head when the same number of threads have been cut as in the preceding operation. If it is desired to change the adjustment to cause the machine to cut a greater or less number of threads, bolt 84 is loosened and the lower member 80 shifted either to the right or to the left, to position the cam portion 81 of member 80 closer or further away from the end 105 of member 83 and bolt 84 again tightened. The upper face of member 80 may be graduated, as indicated in Fig. 9, whereby the operator may be informed as to the number of threads cut for each operation of the machine, a greater or less number of graduations being exposed according to the adjustment of member 80 with respect to member 83.

For the purpose of centering and supporting the pipe during the cutting-off operation by tool 89, a centering device, more clearly shown in Fig. 6, is provided and comprises a centering block 106 mounted on a screw 107 and supported for sliding movement by the ways 108 secured to the die part 29' by bolts 109. Wear between the block 106 and ways 108 may be compensated for by screwing in on the screws 110 threaded into one of the ways, as shown, and engaging a suitable gib 111. The screw 107 extends loosely through the lug 112 formed integrally with die part 29' and is provided on each side of the lug with collars 113 which prevent axial movement of the screw with respect to the lug. The screw 107 is rotated by the hand crank 114, and block 106 is provided with the steel faces 115 shaped as shown to engage the pipe.

As more clearly shown in Fig. 6, the elbow 75 directs oil upon the tools 89 and 98 when the same are in operating position, as shown in Figs. 7 and 8.

The construction of chuck 20 is such as to permit the securing of an attachment thereto for adapting the machine to the cutting of threads or nipples or other short length pipes. The construction of the attachment is not disclosed herein, but forms the subject matter of my copending application for nipple holding chucks, Serial No. 284,917 filed June 13, 1928.

In making a nipple it will be seen that due to the short length thereof it is not possible to move die head 28 close enough to chuck 20 to permit of reaming or chamfering of the end of the nipple by tool 98, and for this reason a reaming or chamfering attachment, designated generally in Fig. 13 by the reference numeral 128, may be mounted on the die head on the side thereof adjacent chuck 20. The attachment 128 comprises the member 129, shaped as shown, and pivotally connected to face plate 44 by the screw 130 and provided with the spaced lugs 131 receiving the reaming or chamfering tool 132 and the bolt 133 for securing the latter to these lugs. The member 129 is provided with the shoulder 134 arranged to engage or seat on one of the nuts 47, as shown, to hold the member in the full line operating position with the axis of tool 132 coincident with that of spindle 12. As more clearly shown in Fig. 14, the construction just described provides a support for tool 132 to hold the latter extended beyond the die head to the left, thereby permitting of ready movement of the tool into cutting relation with the adjacent end of the nipple held in chuck 20. When the tool 132 has served its purpose, member 129 is swung to the left out of operating position, at which time the lug 135 with which the member is provided engages one of the nuts 47 to hold the member out of the way, in the dotted-line position shown. From the foregoing it will be seen that the nuts 47 perform the double function of holding the face plate 44 in position, and of providing stops for holding the tool-supporting member 129 in its respective operative and inoperative positions. It will further be seen that application of attachment 128 to the die head requires only the tapping of face plate 44 at a single point for accommodating screw 130.

As shown in Figs. 2 and 3, a pin 126 is fixed in die part 29' and fits loosely in and engages the ends of an arcuate slot 127 in die part 29 to limit relative movement of these parts in either direction, the slot being concentric with the axis of the die head.

It is to be noted that the supporting portions or members 34 for the die head hold the same at both sides at the center with its axis coincident with the axis of rotation of spindle 12, and that the die head is thus suspended between the runways 35 whereby all strains and leverages are eliminated and the thrust against the chasers made in a straight line.

While but one embodiment of the invention has been shown and described, of course various changes may be made, such as in the size, shape and arrangement of the parts without departing from the spirit of the invention or the scope of the claim.

The invention claimed is:

In a pipe-threading machine, a die head having chaser supporting and adjusting parts supported for relative movement with respect to each other and operable upon such movement in opposite directions to impart inward and outward adjusting movements respectively to the chasers, an element carried by one of said parts, an element pivotally connected to the other of said parts, a block carried by said second-named element for adjustment with respect thereto and arranged upon pivotal movement of the latter for movement into or out of engaging relation with said first-named element to prevent or permit adjusting movement of said parts, and means for adjusting said block with respect to said second-named element.

In witness whereof, I hereto affix my signature.

CHARLES RASMUSSEN.